(12) United States Patent
Gerhardt et al.

(10) Patent No.: US 10,233,683 B2
(45) Date of Patent: Mar. 19, 2019

(54) VEHICLE HAVING DOOR REAR EDGE OPENING MECHANISM

(71) Applicant: Ford Global Technologies, LLC, Dearborn, MI (US)

(72) Inventors: Torsten Gerhardt, London (GB); Jose Paris, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/667,784

(22) Filed: Aug. 3, 2017

(65) Prior Publication Data

US 2018/0044956 A1    Feb. 15, 2018

(30) Foreign Application Priority Data

Aug. 10, 2016   (GB) .................................. 1613778.8

(51) Int. Cl.
*B60J 5/00* (2006.01)
*E05D 3/14* (2006.01)
*B60J 5/04* (2006.01)
*E05D 15/32* (2006.01)

(52) U.S. Cl.
CPC .............. *E05D 3/147* (2013.01); *B60J 5/047* (2013.01); *E05D 15/32* (2013.01); *E05Y 2900/531* (2013.01)

(58) Field of Classification Search
CPC ... E05D 3/147; E05D 15/32; E05D 2900/531; B60J 5/047
See application file for complete search history.

(56) References Cited

U.S. PATENT DOCUMENTS

| | | | |
|---|---|---|---|
| 3,339,226 A | 9/1967 | Brown | |
| 4,641,881 A | 2/1987 | Nomura et al. | |
| 4,856,843 A * | 8/1989 | Elliott | B60P 3/42 296/186.4 |
| 5,992,918 A * | 11/1999 | Gobart | B60J 5/0473 296/146.1 |
| 6,189,748 B1 * | 2/2001 | Hutter | B62D 43/00 224/42.21 |
| 6,382,705 B1 | 5/2002 | Lang et al. | |
| 2007/0152473 A1 | 7/2007 | Lechkun et al. | |
| 2013/0061524 A1 | 3/2013 | Yano | |

FOREIGN PATENT DOCUMENTS

| | | |
|---|---|---|
| DE | 202005021326 U1 | 10/2007 |
| EP | 1193089 A1 | 4/2002 |
| FR | 2734208 A1 | 11/1996 |
| FR | 2746059 A1 | 9/1997 |

* cited by examiner

*Primary Examiner* — Lori L Lyjak
(74) *Attorney, Agent, or Firm* — Vichit Chea; Price Heneveld LLP

(57) ABSTRACT

A vehicle is provided comprising a door having a front edge and a rear edge and an opening mechanism provided substantially at the rear edge of the door. The mechanism comprises two pivot locations configured such that the door opens through a combination of rotation at both pivot locations.

19 Claims, 4 Drawing Sheets

VEHICLE HAVING DOOR REAR EDGE OPENING MECHANISM

FIELD OF THE INVENTION

The present invention generally relates to improvements in or relating to vehicles such as city cars and, in particular, to door configurations compatible with end in parking.

BACKGROUND OF THE INVENTION

Within the urban environment there are considerable problems including congestion and gridlock. Furthermore, many vehicles used within the urban environment are rarely fully occupied as most journeys are taken by one or a maximum of two users. City cars have been designed for this environment. City cars, within the meaning of this specification, are compact vehicles, typically accommodating only one or two occupants and having a small footprint. City cars can be electric, hybrid or run on conventional fuels in a combustion engine.

Some city cars are sufficiently small that they can be parked perpendicular to the curb within a standard parking bay at the roadside. This is advantageous in the urban environment where parking provision is at a premium. However, having parked at a much higher packing density than could be obtained in a conventional vehicle, the driver and any other occupants of the vehicle need to exit the vehicle.

There are various systems available on the market which aims to provide unconventional door openings. For example, the provision of sliding doors can provide easy access in circumstances where the door cannot be opened in a standard manner outward from the vehicle. However, this solution generally is not applicable to city cars where the door occupies more than half of the length of the vehicle because the door would extend beyond the rear of the vehicle and thereby into the road or over the side walk or pavement when the door was opened. This may present unfeasible risks to other road users.

A further example of an unconventional opening is a gull wing door. This is typically provided with a hinge at the top of the door, or in an upper section of the door. The door then rotates around this point and the door moves upwards and outwards to allow the occupant's egress from the vehicle. However, this results in the door extending above the vehicle when the door is in its fully open position. This may be impractical in parking locations frequented by city cars, such as underground car parks or parking lots. Typically such doors are applied to super cars or other vehicles that have a more reclined driving position, resulting in a longer vehicle that would be optimum as a city car.

SUMMARY OF THE INVENTION

According to one aspect of the present invention, a vehicle is provided that includes a first door having a front edge and a rear edge, and an opening mechanism provided substantially at the rear edge of the first door, wherein the opening mechanism comprises two pivot locations configured such that the first door opens through a combination of rotation at both pivot locations.

According to another aspect of the present invention, a vehicle is provided that includes a door having front edge and rear edges, and an opening mechanism provided substantially at the rear edge of the first door and comprising first and second pivot locations configured such that the door opens through a combination of rotation at both the first and second pivot locations.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
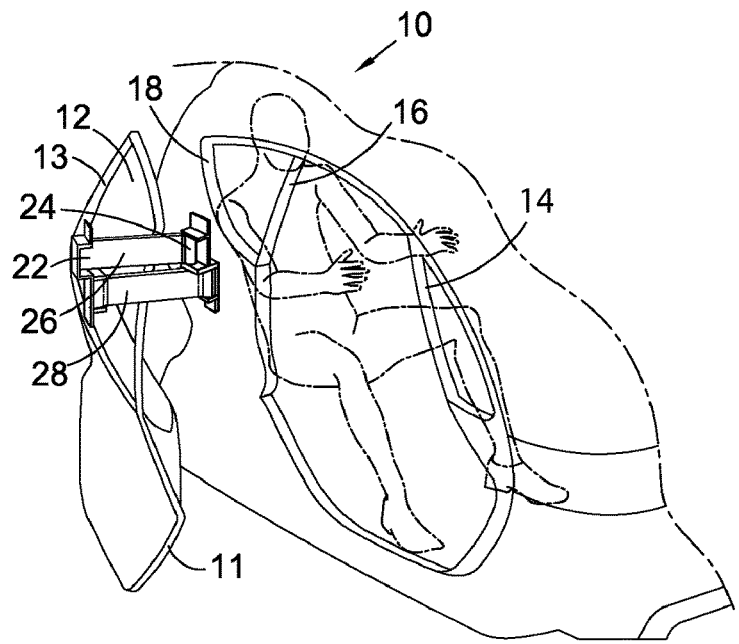
FIG. 1A is a partial perspective view of a vehicle according to a first embodiment with a door in the open position.
Figure 1B:
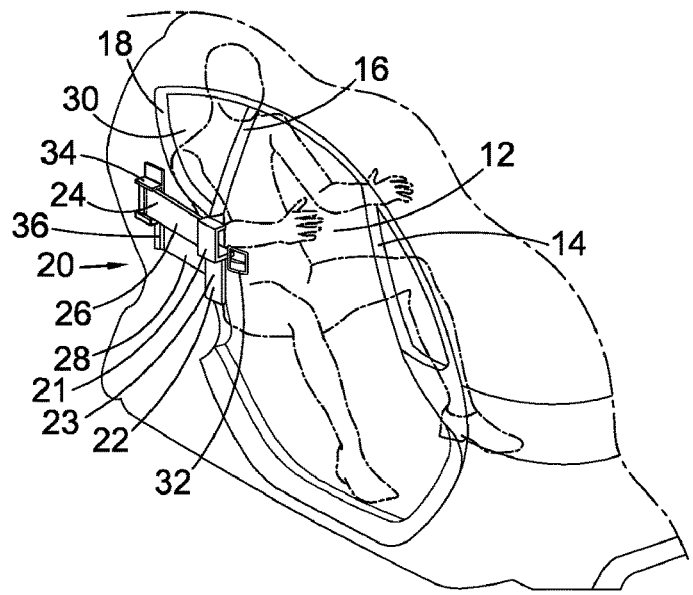
FIG. 1B is a partial perspective view of the view shown in FIG. 1A with the door in the closed position.

FIGS. 1A and 1B show a small city vehicle 10 having a first door 12. The first door 12 has a front edge 11 and a rear edge 13. The door 12 extends substantially between an A-pillar 14 where the front edge 11 of the door is located when the door is in the closed position and a B-pillar 16. The first door 12 is shown in an open position in FIG. 1A and a closed position in FIG. 1B. In the embodiment shown in FIGS. 1A and 1B, the first door 12 is the only door on the illustrated side of the vehicle. The vehicle is therefore commonly referred to as a two-door vehicle, as it has one independently operable door 12 on each side of the vehicle, only one of which is shown in FIGS. 1A and 1B for reasons of clarity.

The first door 12 has an opening mechanism 20 comprising two substantially vertical pivot locations 22, 24 separated by two interconnecting bars 26, 28. The first front pivot location 22 is located substantially in line with the B-pillar 16 and the second rear pivot location 24 is located substantially in line with a C-pillar 18. The front pivot location 22 includes two hinge points 21, 23 and the rear pivot location 24 includes two hinge points 34, 36. Each pair of hinge points is located in the vicinity of the stated pillar. However, a relatively small separation between the two hinge points at each pivot location and the resulting small variation in the length of the interconnecting bars 26, 28 enables the tuning of the overall movement of the door. In the illustrated embodiment, the front hinge points 21, 23 and the rear hinge points 34, 36 are displaced by substantially the same distance such that the interconnecting bars 26, 28 are substantially parallel. However, the horizontal displacement of the front hinge points 21, 23 is smaller than the horizontal displacement of the rear hinge points in order to optimize control of the motion of the first door 12. The two interconnecting bars 26, 28 are substantially horizontal and parallel, but the upper bar 26 is longer than the lower bar 28.

Therefore the upper rear hinge 34 is positioned towards the rear of the vehicle relative to the lower rear hinge 36.

Figure 2A:
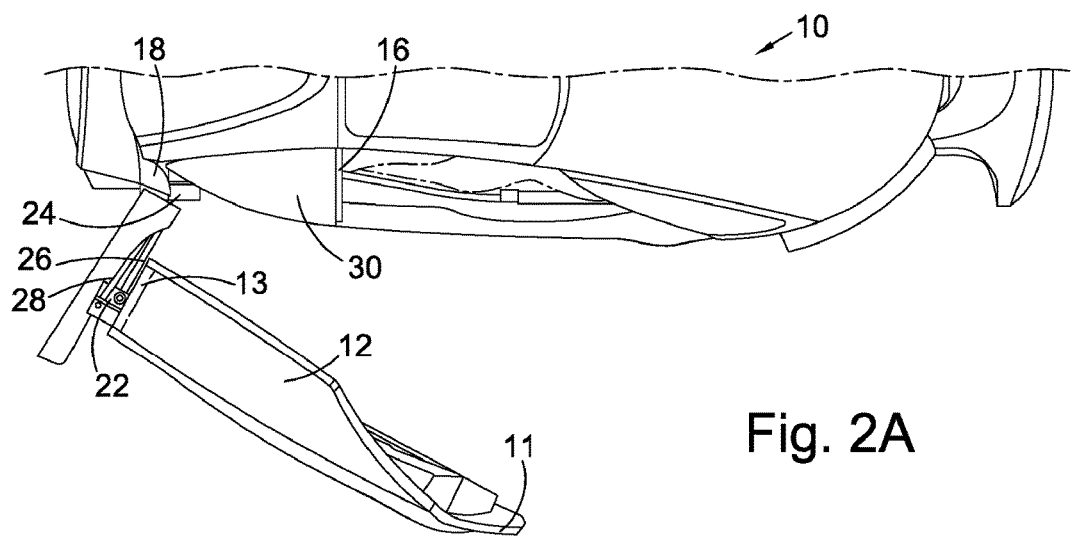
FIG. 2A is a top plan view of an exemplary vehicle, according to a first embodiment, with a door in an open position, according to one example.
Figure 2B:
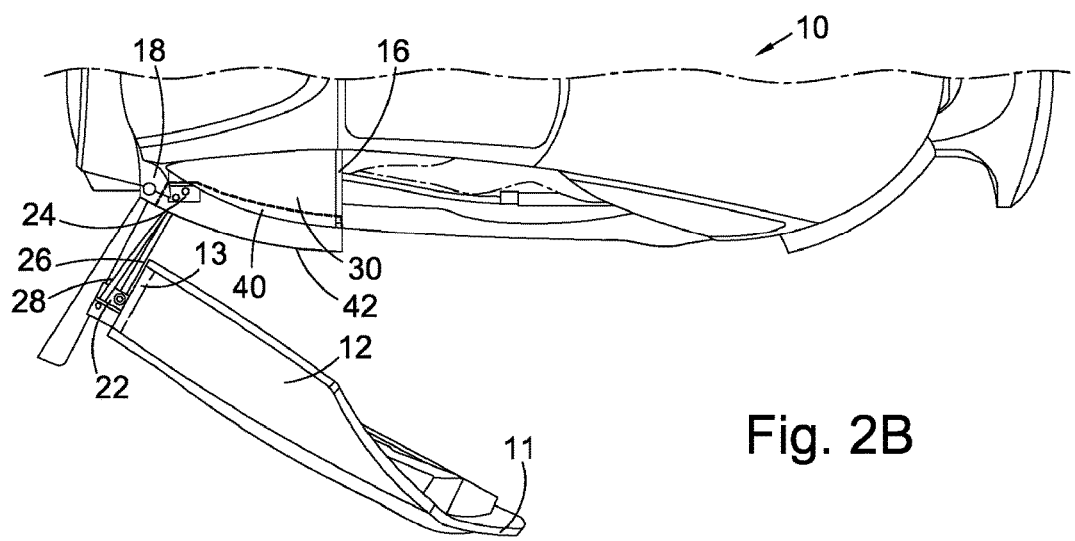
FIG. 2B is a top plan view of the vehicle shown in FIG. 2A, according to another example.

FIGS. 2A and 2B show views from the above of the door 12 in the open position. The interconnecting bars 26, 28 extend between the two pivot locations, substantially between a B-pillar and the C-pillar. As such, the interconnecting bars 26, 28 are substantially coterminous with the rear quarter 30. The bars 26, 28 are located on the outside of the vehicle 10. As illustrated in FIG. 2B, the rear quarter 30 of the vehicle is provided with a recess 40 to accommodate the interconnecting bars 26, 28. The recess 40 is covered by a movable flap 42.

The occupant can exit the vehicle 10 through the space between the A-pillar 14 and the B-pillar 16 while the rear quarter 30 remains in place. The interconnecting bars 26, 28 rotate around the two pivot locations 22, 24 moving the door 12 slightly back along the length of the vehicle and slightly laterally away from the vehicle 10. The combination of these movements provides a suitable opening without requiring the front edge 11 of the first door 12 to extend too far from the vehicle 10. Minimizing the excursion of all parts of the door 12 from the vehicle footprint ensures safe operation regardless of the parking location of the vehicle 10.

Figure 3:
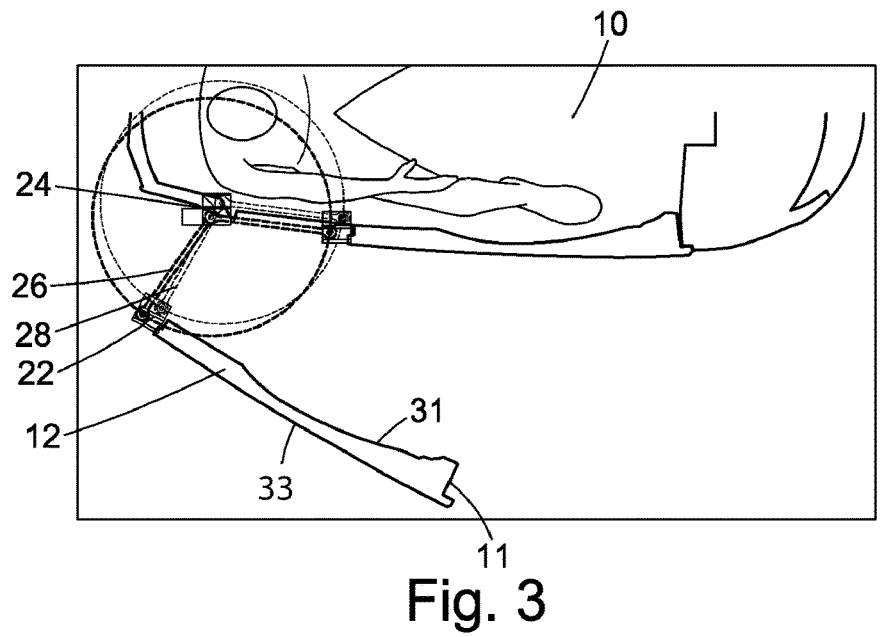
FIG. 3 is a top plan view of the first embodiment showing the range of movement of the pivots.

A handle 32 is provided on the outer surface of the door 12 in the vicinity of the B-pillar 16. In order to open the door 12, the user pulls on the handle 32. The door 12 begins to move laterally away from the vehicle 10 and the interconnecting bars 26, 28 begin to rotate around both pivot locations 22, 24. The extent of the rotation of the bars 26, 28 is illustrated in FIG. 3.

Figure 4:
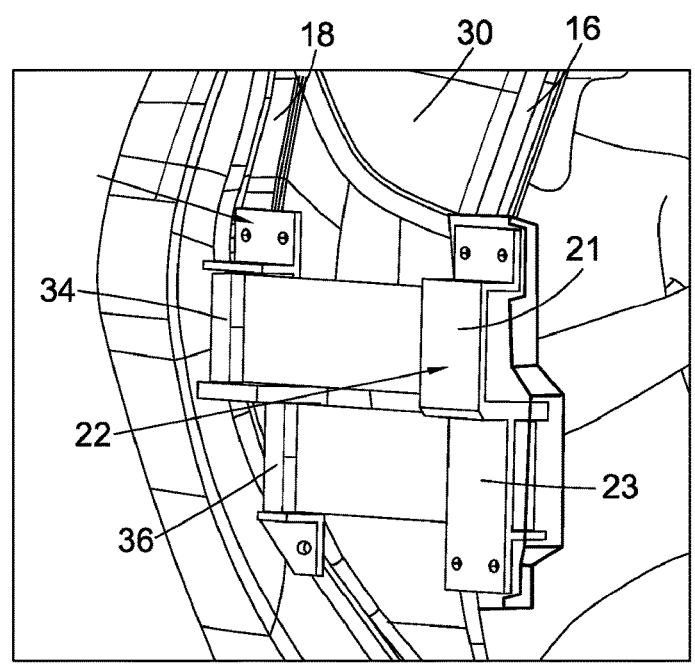
FIG. 4 is a side view of a four bar linkage as deployed in the vehicle.

FIG. 4 illustrates in further detail the mounting of the two interconnecting bars 26, 28. The rear pivot location 24 is provided in the vicinity of the C-pillar 18 and consists of two vertical hinge points 34, 36 slightly offset one from the other to conform to the shape and configuration of the C-pillar 18. The front pivot location 22 is provided in the vicinity of the B-pillar. The extent of the horizontal displacement between the two hinge points 21, 23 is a compromise between packaging requirements and stability. A larger horizontal displacement will provide a more precise control over the door motion but packaging constraints will set a practical maximum displacement.

Figure 5:
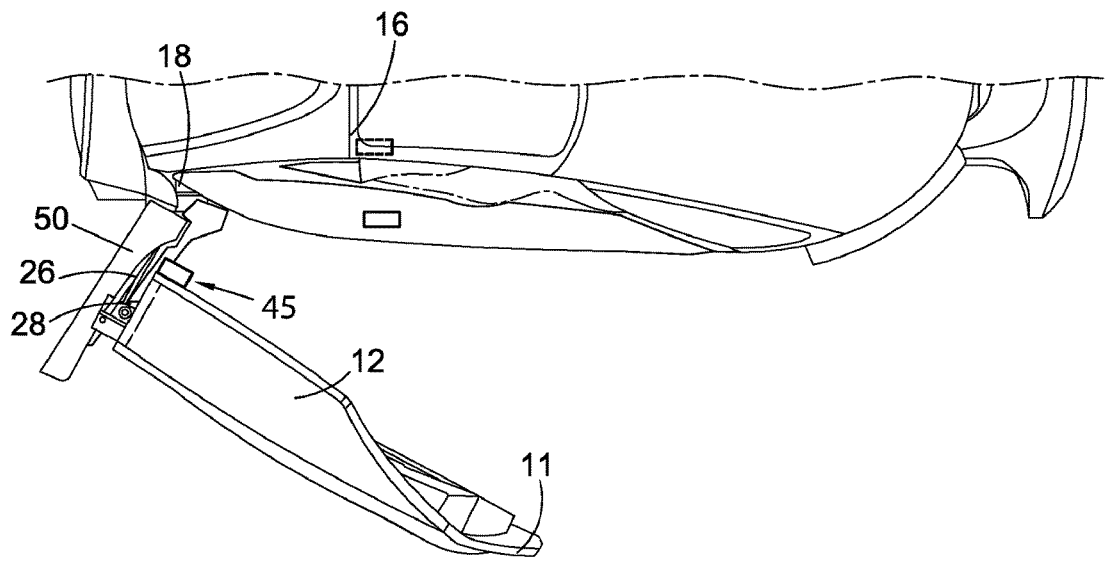
FIG. 5 is a top plan view of a second embodiment with a door in an open position.

FIG. 5 shows a second embodiment and like reference numerals are used where applicable. The second embodiment operates in a similar manner to that described above with reference to FIGS. 1A-4, with the exception that the rear quarter 30 provides a second door 50 which moves together with the first door 12. In this embodiment, the first door 12 and second door 50 are hingedly connected as a bi-fold door 55, thus creating an enlarged opening through which the occupant can exit the vehicle.

The provision of the bi-fold door 55 necessitates the removal the B-pillar 16. While this provides a larger space for access to the vehicle, a reinforcement 45 is required in the door 12 which aligns with position that the B-pillar 16 would occupy in the first embodiment. The provision of a reinforcement 45 ensures that the safety of the vehicle is not compromised by the removal of the B-pillar 16.

Figure 6:
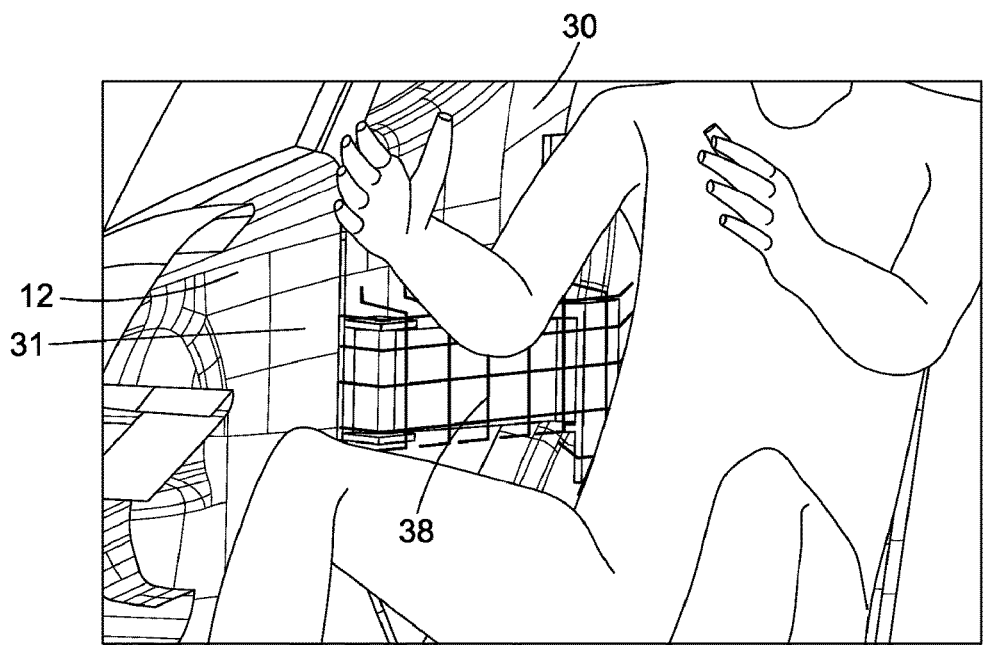
FIG. 6 is a perspective view of the interior surfaces of the door in the second embodiment.

FIG. 6 illustrates the packaging of the interconnecting bars 26, 28 which indirectly provide an arm rest 38 for the vehicle occupant. The arm rest 38 is applicable to both the first and second embodiments illustrated and described above with reference to FIGS. 1A-5, although there will be differences in packaging, in both embodiments the interconnecting bars 26, 28 must be packaged within the vehicle footprint and therefore they will impinge indirectly or directly on the vehicle interior. As human shoulders are typically wider than the hips and the hips are typically wider than the waist, the bars 26, 28 are packaged at waist height.

For the embodiment illustrated in FIGS. 1A and 1B, the bars 26, 28 are located in the wet area outside of the sealed interior. The outer bar 28 may be attached rigidly to an outer door panel 32 or it may be provided beneath a movable flap 42. The sealed interior is bounded by an inner door panel 31 which is shaped to accommodate the interconnecting bars, in particular inner interconnecting bar 26. The inner door panel 31 is also provided with trim to form an armrest 38.

For the embodiment illustrated in FIG. 5, the packaging of the interconnecting bars 26, 28 could be achieved in either the dry area or the wet area. If the interconnecting bars 26, 28 are to be packaged in the wet area, then the inner door panel 31 would be rigidly mounted or integral with the interconnecting bar 26 so that the two move together. The inner surface of this panel 31 would then be provided with trim that forms an arm rest 38. The outer bar 28 can be either hidden in a recess 40 under a movable flap 42 or it can be formed integrally with the outer door panel 32.

Packaging the interconnecting bars 26, 28 within the dry area is not compatible with the provision of a window that opens by a drop glass mode of operation. The outer interconnecting bar 28 is rigidly attached to the outer door panel 33 and body seals are provided on the outer door panel 33. Consequently, the inner bar 26 is part of the dry area of the vehicle and can be trimmed directly to form the arm rest 38. Alternatively, the inner interconnecting bar 26 may be concealed in a hidden cavity (not shown) between the outer door panel 33 and the inner panel 31 on which the arm rest 38 is provided.

According to one aspect of the disclosure, there is provided a vehicle comprising a first door having a front edge and a rear edge and an opening mechanism provided substantially at the rear edge of the door. The mechanism comprises two pivot locations configured such that the door opens through a combination of rotation at both pivot locations.

The opening mechanism provides two pivots locations at or near the back edge of the door. In doing so, it provides a rear hinged door that allows to the user to see the edge of the door whilst opening it, thus reducing the risk of collision with an adjacent object or road user.

The dual pivot point allows the excursion from the vehicle's footprint to be minimized whilst providing a sufficient opening to enable the occupant's egress. The door panel moves only a limited distance from the vehicle with the opening being provided as a result of the two pivot points.

The opening edge of the door, in this case the front edge of the door, does not need to swing as far from the vehicle as a single hinged door would need to move to provide the same space for exit. Furthermore, the door does not extend beyond the vehicle footprint behind, in front or above the vehicle.

At least one interconnecting bar may be provided between the two pivot locations and this bar may therefore contribute to the creation of the opening space. The interconnecting bar may have a first end and a second end. The length of the bar dictates the maximum excursion of the door from the vehicle, which occurs when the bar has rotated to be perpendicular to the plane of the door in its closed position.

The bar may be substantially horizontal in order to provide a substantially orthogonal connection with substantially vertical pivot pins positioned at each pivot location. The provision of the bar in a substantially horizontal configuration minimizes unwanted moments about the bar and maximizes the opening space provided when the door is in the open position. However, there may be packaging requirements that mean that some excursion from a horizontal configuration is preferable. Within the meaning of this specification therefore, substantially horizontal is intended to include any configuration that is horizontal or 5°, 10° or 15° from the horizontal.

The pivot location on the first door may be located forwards of the pivot location on the fixed body structure of the vehicle.

The two pivot locations may be separated by two substantially parallel bars forming a four bar linkage. The provision of a four bar linkage, with two substantially parallel bars allows the mechanism to be tailored more accurately to the vehicle shape.

Each pivot location may be provided with two hinge points. The provision of two hinge points at each pivot location enables the length of the bars to be selected in order to tune the movement of the vehicle door. For example, in some embodiments the bars may be substantially horizontal and parallel, but of differing lengths. This is advantageous in that it allows the mechanism to be packaged conveniently within a non-vertical C-pillar section. However, the differing lengths of the arms contribute to the overall motion of the door which is a composite motion of swinging about the rear two hinge points, at the rear pivot location, and the motion of the door outward from the vehicle. This enables the front edge of the door to move further from the vehicle than the rear edge, while rotating through a smaller angle than a conventional door to achieve the same opening.

The forward hinge points may be spaced apart from one another both vertically and horizontally to provide an inboard forward hinge point and an outboard forward hinge point. Furthermore, the rearward hinge points may be spaced apart both vertically and horizontally from one another to provide an inboard rearward hinge point and an outboard rearward hinge point.

One of each of the forward hinge points and one of each of the rearward hinge points may be aligned in a substantially vertical plane. The outboard forward hinge point may be aligned in a substantially vertical plane with the outboard rearward hinge point. The inboard forward hinge point may be aligned in a substantially vertical plane with the inboard rearward hinge point. The outboard hinge points may be connected by a substantially horizontal interconnecting bar and the inboard hinge points may be connected by a substantially horizontal interconnecting bar.

The length of the interconnecting bars may determine a maximum lateral displacement of the rear edge of the first door when opening. The horizontal spacing of rearward hinge points may be in a range of between 10 mm and 300 mm and horizontal spacing of forward hinge points may be in a range of between 10 mm and 300 mm. The horizontal spacing of the front hinge points must be sufficient to facilitate control of the motion of the door and it cannot exceed reasonable vehicle package limitations.

The vertical arrangement of the two forward and two rearward hinge points and the two interconnecting bars may be selected such that the vertical offset between the two substantially aligned sets of hinge points is greater than the height of at least the less-high one of the two interconnecting bars. This ensures that the two bars do not interfere with each other during the opening motion of the first door. Furthermore, this embodiment enables the pivot locations to be vertically stacked in order to provide an improved lateral package of the mechanism as a whole.

At least one of the bars may be located in a recess provided in a vehicle structure. The recess in the vehicle structure may be open to the exterior of the vehicle and may be covered by a movable flap to facilitate motion of the interconnecting bars out of the recess during opening.

In some embodiments, the first door is the only independently operable door disposed on a side of the vehicle. This distinguishes these embodiments from vehicles where two independently operable doors are provided on each side of the vehicle. In some embodiments, the single door on each side of the vehicle may have multiple parts, as will be exemplified below, but the parts move together as a result of actuation with a single handle. In other embodiments, the vehicle is a two-door vehicle with one door being disposed on each side of the vehicle. In some embodiments, the forward pivot location is on the rear edge of the one door and the rearward pivot location is mounted substantially rearwards thereof on the vehicle structure. In some embodiments, the distance between the front and rear pivot locations spans a length of the vehicle structure substantially equal to the length of the interconnecting bars.

The vehicle may further comprise a movable structure disposed between the forwards and rearwards pivot locations and rigidly fixed to the interconnecting bar or one of the interconnecting bars. The movable structure may form the interconnecting bar or one of the interconnecting bars. The movable structure may be a second door horizontally adjacent to the first door and the two doors are hingedly connected to a vehicle structure by at least one of the two bars and two of the hinge points.

The forward edge of the second door may provide at least one of the forward hinge points and the rear edge of the second door may provide at least one of the rear hinge points. The first and second doors may be interconnected by at least one of the forward hinge points and may be connected to the vehicle structure by at least one of the rearward hinge points.

The first and second doors may be configured to open together to provide one contiguous opening and the length of the opening may be substantially the sum of the first door forwards of the forward pivot location and the length of at least one of the bars.

The first and second doors may form a bi-fold door such that the forward pivot location defines the central fold axis of the bi-fold door. The first and second doors of the bi-fold door may be reinforced substantially at their respective vertical end planes adjacent to the central fold axis.

The vehicle may further comprise a reinforcement arranged to coincide substantially with an upper and lower intersection of the central fold axis of the bi-fold door arrangement with the vehicle structure.

The vehicle structure and the bi-fold door may provide a mechanical stop to inhibit the bi-fold door from hinging about its central fold axis when closed and subjected to external forces, arranged substantially above and below the central fold axis and mounted to the reinforcements provided in the vehicle structure and the bi-fold door. The mechanical stop may be a latch and striker arrangement.

The opening mechanism may be covered on the interior of the vehicle by a trim panel and the vertical position of the hinge mechanism may be disposed at a height such that the trim panel corresponds substantially to the height of the waist of an occupant sitting adjacent to the trim panel. The trim panel may form an armrest.

The vehicle may further comprise a handle on the exterior and a handle on the interior, each located forwards of the forward hinge location. In some embodiments the handle is provided half a door length forwards of the forward hinge location. If the handle is provided further forward than half a door length forwards of the forward hinge location it can make latching at the rear edge of the door challenging. Therefore in some embodiments, the handle is less than half a door length forwards of the forward hinge location. The handle may be substantially aligned with the forward hinge location.

It will be appreciated by those skilled in the art that although the invention has been described by way of example with reference to several embodiments it is not limited to the disclosed embodiments and that alternative embodiments could be constructed without departing from the scope of the invention as defined in the appended claims.

It will further be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle comprising:
a first door having a front edge and a rear edge; and
an opening mechanism provided substantially at the rear edge of the first door, wherein the mechanism comprises two pivot locations separated by two substantially parallel interconnecting bars forming a four bar linkage and configured such that the first door opens through a combination of rotation at both pivot locations.

2. The vehicle according to claim 1, wherein the two pivot locations are separated by at least one interconnecting bar having a first end and a second end.

3. The vehicle according to claim 2, wherein the interconnecting bar is substantially horizontal.

4. The vehicle according to claim 2, wherein a first pivot location at the first end of the interconnecting bar is located on the first door and a second pivot location at the second end of the interconnecting bar is located on a fixed body structure of the vehicle, and wherein the first pivot location on the first door is located forwards of the second pivot location on the fixed body structure of the vehicle when the door is in a closed position.

5. A vehicle comprising:
a first door having a front edge and a rear edge; and
an opening mechanism provided substantially at the rear edge of the first door, wherein the mechanism comprises two pivot locations configured such that the first door opens through a combination of rotation at both pivot locations, wherein each of the two pivot locations comprises two hinge points, wherein forward hinge points are spaced apart from one another both vertically and horizontally to provide an inboard forward hinge point and an outboard forward hinge point and wherein the rearward hinge points are spaced apart both vertically and horizontally from one another to provide an inboard rearward hinge point and an outboard rearward hinge point.

6. The vehicle according to claim 5, wherein one of each of the forward hinge points and one of each of the rearward hinge points are aligned in a substantially vertical plane.

7. The vehicle according to claim 5, wherein the outboard forward hinge point is aligned in a substantially vertical plane with the outboard rearward hinge point and the inboard forward hinge point is aligned in a substantially vertical plane with the inboard rearward hinge point.

8. The vehicle according to claim 5, wherein the outboard forward and rearward hinge points are connected by a substantially horizontal interconnecting bar and the inboard forward and rearward hinge points are connected by a substantially horizontal interconnecting bar.

9. The vehicle according to claim 5, wherein the two pivot locations are separated by two substantially horizontal interconnecting bars, and wherein length of the two interconnecting bars determines a maximum lateral displacement of the rear edge of the first door when opening and wherein horizontal spacing of the rearward hinge points is in a range of between 10 mm and 300 mm and horizontal spacing of the forward hinge points is in a range of between 10 mm and 300 mm.

10. The vehicle according to claim 9, wherein vertical arrangement of the two forward and two rearward hinge points and the two substantially horizontal interconnecting bars is selected such that vertical offset between two substantially aligned sets of hinge points is greater than height of at least the less-high one of the two substantially horizontal interconnecting bars.

11. The vehicle according to claim 10, wherein at least one of the substantially horizontal interconnecting bars is located in a recess provided in a vehicle structure, and wherein the recess in the vehicle structure is open to the exterior of the vehicle and is covered by a moveable flap to facilitate motion of the interconnecting bars out of the recess during opening.

12. A vehicle comprising:
a first door having a front edge and a rear edge; and
an opening mechanism provided substantially at the rear edge of the first door, wherein the mechanism comprises two pivot locations configured such that the first door opens through a combination of rotation at both pivot locations, wherein the two pivot locations are separated by at least one interconnecting bar having a first end and a second end, and wherein the first door is the only independently operable door disposed on a side of the vehicle.

13. The vehicle according to claim 12 further comprising a movable structure disposed between forward and rearward pivot locations and rigidly fixed to the at least one interconnecting bar.

14. The vehicle according to claim 13, wherein the movable structure forms the at least one interconnecting bar.

15. The vehicle according to claim 13, wherein the movable structure is a second door adjacent to the first door and the two doors are hingedly connected to a vehicle structure by at least one of two interconnecting bars and two of the hinge points, and wherein a forward edge of the second door provides at least one of forward hinge points and a rear edge of the second door provides at least one of rear hinge points and the first and second doors are interconnected by at least one of forward hinge points and connected to a vehicle structure by at least one of the rearward hinge points.

16. The vehicle according to claim 15, wherein the first and second doors open together to provide one contiguous opening and length of an opening is substantially the sum of the first door forwards of the forward pivot location and the length of at least one of the at least one interconnecting bar.

17. The vehicle according to claim 15, wherein the first and second doors form a bi-fold door such that a forward pivot location defines a central fold axis of the bi-fold door, wherein the first and second doors of the bi-fold door are reinforced substantially at respective vertical end planes adjacent to the central fold axis, and further comprising a reinforcement arranged to coincide substantially with an upper and lower intersection of the central fold axis of the bi-fold door arrangement with the vehicle structure, and wherein the vehicle structure and the bi-fold door provide a mechanical stop to inhibit the bi-fold door from hinging about its central fold axis when closed and subjected to external forces, arranged substantially above and below the central fold axis and mounted to the reinforcements provided in the vehicle structure and the bi-fold door.

18. The vehicle according to claim 1 further comprising a handle on an exterior located forwards of a forward hinge location, wherein the opening mechanism is covered on an interior of the vehicle by a trim panel and vertical position of the hinge mechanism is disposed at a height such that the trim panel corresponds substantially to height of a waist of an occupant sitting adjacent to the trim panel, and wherein the trim panel forms an armrest.

19. A vehicle comprising:
a door having a front edge and a rear edge;
an opening mechanism provided substantially at the rear edge of the door and comprising first and second pivot locations configured such that the door opens through a combination of rotation at both the first and second pivot locations; and
a handle on an exterior located forwards of a forward hinge location, wherein the opening mechanism is covered on an interior of the vehicle by a trim panel and vertical position of the hinge mechanism is disposed at a height such that the trim panel corresponds substantially to height of a waist of an occupant sitting adjacent to the trim panel, and wherein the trim panel forms an armrest.

* * * * *